Patented Aug. 2, 1938

2,125,636

UNITED STATES PATENT OFFICE 2,125,636

METHOD OF STABILIZING GASOLINES

William W. Holland, Baltimore, Md., assignor to Petroleum Conversion Corporation, New York, N. Y., a corporation of Delaware No Drawing. Application June 3, 1936, Serial No. 83,267

5 Claims. (Cl. 196—33)

My present invention relates to improvements in methods of gasoline stabilization employing inhibitors or anti-oxidants. The used of such substances, which exert an anti-catalytic effect in inhibiting gum formation, is usually preceded by somewhat drastic treatment of the gasoline distillate involving either a sulphuric acid treatment, or the use of zinc chloride or similar salts at elevated temperatures, or treatment at high temperatures and pressures with clay, or combination of these steps. All these treatments, however, have the drawback that they are expensive, result in considerable loss of gasoline in the form of sludges or polymers which have little or no commercial value, and furthermore, in many cases effect a diminution in the octane rating of the gasoline. Whatever treatment is employed, it is usual to follow it by a so called doctor treatment for the removal or neutralization of objectionable sulphur compounds in the gasoline. This doctor treatment consists in adding sodium plumbite solution to the gasoline, agitating the mixture and then adding either in solid form or in a solution in gasoline the smallest quantity of elementary sulphur which will precipitate the suspended sulphides.

I have discovered that cracked gasolines may be rendered stable and maintained suitable for use for extended periods by the use of known inhibitors in combination with doctor treatment but without the employment of preliminary drastic refining treatments. My discovery is based upon my observation that the ordinary doctor treatment leaves minute quantities of alkali which, although minute, nevertheless cause a deterioration of the inhibitor so that the effectiveness of the latter may be only a small fraction of the total effectiveness possible. When the inhibitor is thus used under conditions reducing its effectiveness it is necessary to employ the drastic preliminary treatments mentioned with the attendant expense and inconveniences above pointed out.

In carrying out my invention, after doctor treatment of the gasoline distillate which has not undergone preliminary chemical treatment it is thoroughly washed with water in order to remove as completely as possible all traces of alkali. Experience has shown, however, that even the most thorough water-washing is not sufficient to remove the alkali completely. To accomplish this and to insure that the inhibitor subsequently to be added shall be fully effective, the washed gasoline is treated with an agent of mildly acidic character, e. g. a weak organic acid such as acetic acid, or preferably with the solution of a mildly acidic salt as for example, sodium bisulphite, aluminum sulfate, or the like. The following is an illustrative example of my improved method.

A west Texas vapor phase cracked gasoline distillate containing approximately 45% of unsaturated hydro-carbons was agitated with 20° A. P. I. doctor solution and the suspended sulphides precipitated with barely enough sulphur to produce a clear supernatant liquid upon settling. The excess doctor and precipitated sulphides were withdrawn and the solution thoroughly washed with water. In this condition the gasoline and wash water appeared to be entirely neutral to the most delicate indicators. It did contain, however, a sufficient amount of alkali to render any inhibitor more or less ineffective, as was determined by accelerated aging tests. To neutralize the remaining traces of alkali the gasoline was subjected to special treatment by agitation with an aqueous solution containing 20.0% of sodium bisulphite and again water washed. This treatment imparted to the gasoline a slight turbidity which, however, was removed by cold filtration through a 24 inch bed of 40–80 mesh fuller's earth of a type inactive to produce polymerization. The clarified gasoline was then inhibited with a predetermined amount of a suitable anti-oxidant and proved to be stable as shown by the accelerated aging test. The present invention may utilize any known inhibitor, as, for example, triethylamine, hydroquinone, alpha-naphthol, catechol, diethylamine, monobenzyl-para-aminophenol, dibenzyl-para-aminophenol and other compounds of the phenol and amino groups. My invention, however, is not limited to the use of any of these, but may employ any available gum-inhibitor.

One example of the gasoline so treated contained .06% sulphur. It was sweet to the doctor test, of good odor and entirely non-corrosive to a strip of polished copper immersed in the gasoline for 30 minutes at 212° F., gave a 4-hour induction period, without pressure drop, in the accelerated aging test bomb under 100 pounds gauge pressure per square inch of oxygen at 212° F. The potential gum content of the gasoline after removal from the aging test bomb was 141.6 mg. per 100 c.c. by the glass dish method. The octane number of the gasoline before treatment was 77, motor method, and remained unchanged after treatment. The recovery of finished gasoline was approximately 99% of the gasoline distillate used.

The use of an acid neutralizing agent of weak hydrogen-ion concentration is necessary, as if a strong acid is used, even in dilute form, sufficient traces of acid will be left to damage the effectiveness of the inhibitor, as I have found that this diminution in effectiveness occurs not only in the presence of a slight excess of alkali but also in the presence of a slight excess of acid. Should a strong acid be used for neutralization, it would then be necessary to add an alkaline neutralizing agent having a low hydroxyl-ion concentration. Therefore, following the doctor treatment a neutralizing agent should be used which, if an acid, is feebly ionized in solution, or if a salt, likewise leaves the solution without an appreciable hydrogen-ion concentration.

In the above example I have called for the use of fuller's earth as the filtering medium. Occasionally a fuller's earth will be found which is active enough even in the cold to induce polymerization of the gasoline substance, in which case it should not be used. In lieu of fuller's earth, various conventional filtering media may be employed which do not have any action upon the gasoline, as, for example, charcoal, sand, canvas blankets, filtering paper or the like.

It will be understood that various changes may be made in the detailed example above given, without departing from the spirit of my invention or the scope of the appended claims.

I claim:

1. The method of stabilizing gasoline involving the use of an inhibitor, which consists in first subjecting the raw gasoline to the action of an alkali plumbite solution to doctor sweeten the same, water washing to remove excess plumbite solution dissolved or entrained in the gasoline, removing the last traces of alkali imparted by said alkali plumbite solution by intimately commingling said gasoline with an aqueous solution of a normally mildly acidic compound which provides low hydrogen ion concentration, removing the excess of such solution last mentioned whereby substantially complete neutralization of said alkali traces is effected without leaving the solution appreciably acid, and then adding the inhibitor.

2. The method according to claim 1, in which the step of removing the excess neutralizing solution furnishing low concentration of hydrogen ion includes filtration, thereby removing turbidity occasioned by said solution.

3. The method of stabilizing gasoline involving the use of an inhibitor, which consists in first subjecting the raw gasoline to the action of an alkali plumbite solution to doctor sweeten the same, water washing to remove excess plumbite solution dissolved or entrained in the gasoline, removing the last traces of alkali imparted by said alkali plumbite solution by intimately commingling said gasoline with an aqueous solution of sodium bisulfite, removing the excess of said solution whereby substantially complete neutralization of said gasoline is effected, and then adding the inhibitor.

4. The method of stabilizing gasoline involving the use of an inhibitor, which consists in first subjecting the raw gasoline to the action of an alkali plumbite solution to doctor sweeten the same, water washing to remove excess plumbite solution dissolved or entrained in the gasoline, removing the last traces of alkali imparted by said alkali plumbite solution by intimately commingling said gasoline with an aqueous solution of aluminum sulfate, removing the excess of said solution whereby substantially complete neutralization of said gasoline is effected, and then adding the inhibitor.

5. The method of stabilizing gasoline involving the use of an inhibitor, which consists in first subjecting the raw gasoline to the action of an alkali plumbite solution to doctor sweeten the same, water washing to remove excess plumbite solution dissolved or entrained in the gasoline, removing the last traces of alkali imparted by said alkali plumbite solution by intimately commingling said gasoline with an aqueous solution of acetic acid, removing the excess of said solution whereby substantially complete neutralization of said gasoline is effected, and then adding the inhibitor.

WILLIAM W. HOLLAND.

DISCLAIMER 2,125,636.—*William W. Holland*, Baltimore, Md. METHOD OF STABILIZING GASOLINES. Patent dated August 2, 1938. Disclaimer filed July 1, 1939, by the assignee, *Petroleum Conversion Corporation*.

Hereby enters this disclaimer of all the claims in said Letters Patent.

[*Official Gazette July 25, 1939.*]